US005291959A

United States Patent [19]

Malblanc

[11] Patent Number: 5,291,959

[45] Date of Patent: Mar. 8, 1994

[54] INDIVIDUAL VEHICLE USABLE IN A MANUAL OR A MOTORIZED VERSION, IN PARTICULAR A WHEELCHAIR OR A TRICYCLE

[75] Inventor: Paul Malblanc, Paris, France

[73] Assignee: Etablissements Poirier (Societe Anonyme), Fondettes, France

[21] Appl. No.: 872,393

[22] Filed: Apr. 23, 1992

[30] Foreign Application Priority Data

Apr. 26, 1991 [FR] France ............................... 91 05182

[51] Int. Cl.[5] ............................................. B62B 3/02

[52] U.S. Cl. ...................................... 180/11; 180/907; 180/16; 280/304.1

[58] Field of Search .................. 180/11, 16, 90.7, 216, 180/65.1; 280/304.1

[56] References Cited

U.S. PATENT DOCUMENTS

| | | | |
|---|---|---|---|
| 4,452,327 | 6/1984 | Mowat et al. | 180/11 |
| 4,643,446 | 2/1987 | Murphy et al. | 180/907 X |
| 4,944,359 | 7/1990 | Doman et al. | 180/208 |
| 5,154,251 | 10/1992 | Fought | 180/216 X |

FOREIGN PATENT DOCUMENTS

| | | | |
|---|---|---|---|
| 2729267 | 6/1977 | Fed. Rep. of Germany . | |
| 665928 | 10/1948 | United Kingdom . | |
| 2061197 | 5/1981 | United Kingdom | 180/907 |
| 2223994A | 4/1990 | United Kingdom . | |
| 9010568 | 9/1990 | World Int. Prop. O. | 180/216 |

*Primary Examiner*—Margaret A. Focarino
*Assistant Examiner*—Victor E. Johnson
*Attorney, Agent, or Firm*—Nixon & Vanderhye

[57] ABSTRACT

The present invention relates to an individual vehicle usable in a manual or a motorized version, in particular a wheelchair or a tricycle, including a chassis (1) provided at the rear with two bearings designed to receive removable wheels (2). According to the invention, this vehicle is able to be equipped with a self-contained propulsion unit (12) comprising driving wheels (13), a structure (14) for rotationally driving the driving wheels, a support suitable for supporting the bearings when the removable wheels (2) are removed, a locking device suitable for cooperating with a retaining device (11) provided on the chassis (1) when the bearings rest on the support, and a control (17) for moving the locking device between an active and an inactive position.

11 Claims, 5 Drawing Sheets

INDIVIDUAL VEHICLE USABLE IN A MANUAL OR A MOTORIZED VERSION, IN PARTICULAR A WHEELCHAIR OR A TRICYCLE

BACKGROUND OF THE INVENTION

1. Field of the Invention

The present invention relates to an individual vehicle usable in manual or motorized versions, in particular a wheelchair or a tricycle, including a chassis provided at its rear with two bearings designed to receive removable wheels.

2. Discussion of the Prior Art

The choice of a wheelchair can depend on the nature of the user's handicap, on the activities that he or she practices and on the environment. A person having little activity outside the home may thus choose a wheelchair without a motor, whereas someone who wishes to travel over long distances may chose a motorized wheelchair.

Motorized wheelchairs require no physical effort on the part of their users and can thus be used very easily by severely handicapped persons. However, as they are bulky, it is often difficult to use them in a confined space such as a dwelling. They are, furthermore, difficult to transport and expensive.

SUMMARY OF THE INVENTION

The present invention offers a solution for these problems by providing an individual vehicle that is usable in a manual or a motorized version, in particular a wheelchair or a tricycle, which includes a chassis provided at the rear with two bearings designed to receive removable wheels and which is characterized in that it is able to be equipped with a self-contained propulsion unit comprising driving wheels, means for rotationally driving the driving wheels, support means suitable for supporting the bearings when the removable wheels are removed, locking means suitable for cooperating with retaining means provided on the chassis when the bearings rest on the support means, and control means for moving the locking means between an active position and an inactive position.

Thanks to this set of arrangements, it is now possible to convert a motorless individual vehicle quickly and easily into motorized individual vehicle, and vice versa. The conversion can, in fact, be made in a short space of time without the help of tools.

A handicapped person will thus be able to use his or her wheelchair in a manual version for travelling over short distances or in the home, and in a motorized version to travel over relatively large distances outside the home. The user thus has a wheelchair providing an optimum response to his or her needs.

According to one particular form of embodiment of the invention, the support means include two parallel flanges projecting on the forward transverse face of the propulsion unit and advancing on either side of the bearings when it is in the assembly position, these flanges having a transverse forward face comprising a slot provided with an entry and a circular bottom the radius of which is slightly greater than that of the bearings.

Moreover, the retaining means can include a rod extending parallel to the bearings, above one of the latter, while the locking means can include a hook pivotally mounted about an axis parallel to the axis of the wheels of the propulsion unit and an elastic member biasing the hook into its active position.

In order to achieve a better connection between the chassis and the propulsion unit, it is preferable, however, for the retaining means to include two coaxial rods extending parallel to the bearings, above the latter, and for the locking means to include two hooks pivotally mounted about an axis parallel to the axis of the wheels of the propulsion unit, as well as elastic members biasing the hooks into their active positions.

Advantageously, the control means include a handle having the shape of an inverted U the base of which extends parallel to the axis of the wheels of the propulsion unit and the arms of which are movable heightwise in guide sleeves parallel to the forward transverse face of the said propulsion unit. Two coaxial links are fixed to the free ends of the arms of the handle in such a way that they extend outwardly of the said handle, parallel to its base, and two connecting rods connecting the links to the hooks.

It is sufficient to lift the handle to separate the propulsion unit from the chassis when they are connected to one another. This action in fact enables the hooks to be disengaged from the rods and, consequently enables the propulsion unit to be detached from the chassis.

It should further be noted that the handle can also be used to transport the propulsion unit when it is detached from the chassis.

Preferably, the propulsion unit comprises caster wheels projecting on the lower part of its rear transverse face so as to come into contact with the ground when it is not integral with the chassis.

Thanks to its caster wheels, the propulsion unit can thus be displaced easily when the means for driving its driving wheels are actuated.

The means for driving the driving wheels of the propulsion unit are preferably constituted by one or two electric motors powered by batteries. To facilitate access to these batteries, the propulsion unit can advantageously comprise at least one housing opening onto its rear transverse face and onto its upper face, a link extending in the vicinity of the rear lower edge of the housing, parallel to the axis of its wheels, a battery box placed in the housing in such a way that it rests on the link so as to be able to pivot between a connected position in which the batteries are connected to an electric circuit in which are mounted the driving wheel drive means and a disconnected position in which the batteries are isolated from the electric circuit.

Preferably, each battery box comprises locking members suitable for cooperating with retaining members provided in the housing when it is in its connected position, and control members for moving the locking members between an active position and an inactive position.

These arrangements have the advantage of permitting reliable operation of the means for driving the driving wheels of the propulsion unit when the battery box is locked in its connected position. They also have the advantage of facilitating the removal and re-installation of the battery box respectively before and after electrically recharging the batteries.

According to one preferred embodiment of the invention, the retaining members include two coaxial rods extending parallel to the handle, in the vicinity of the forward upper edge of each housing, while the corresponding locking members include two hooks pivotally mounted about an axis parallel to the rods, and elastic members biasing the hooks into their active positions.

As to the control members of each battery box, these include a gripping bar extending parallel to the axis of the wheels of the propulsion group, this bar projecting on the upper portion of the battery box and connecting the hooks at a position located ahead of their respective pivotal axes.

The individual vehicle according to the invention further includes a manipulator connected to the propulsion unit via a removable transmission cable, the manipulator being suitable for controlling the means for driving the propulsion unit drive wheels when it is actuated.

The present invention also relates, of course, to the propulsion unit presented above.

BRIEF DESCRIPTION OF THE DRAWINGS

One embodiment of the present invention will be described below in an example with reference to the annexed drawings, wherein.

DETAILED DISCUSSION OF PREFERRED EMBODIMENT

Figure 1:
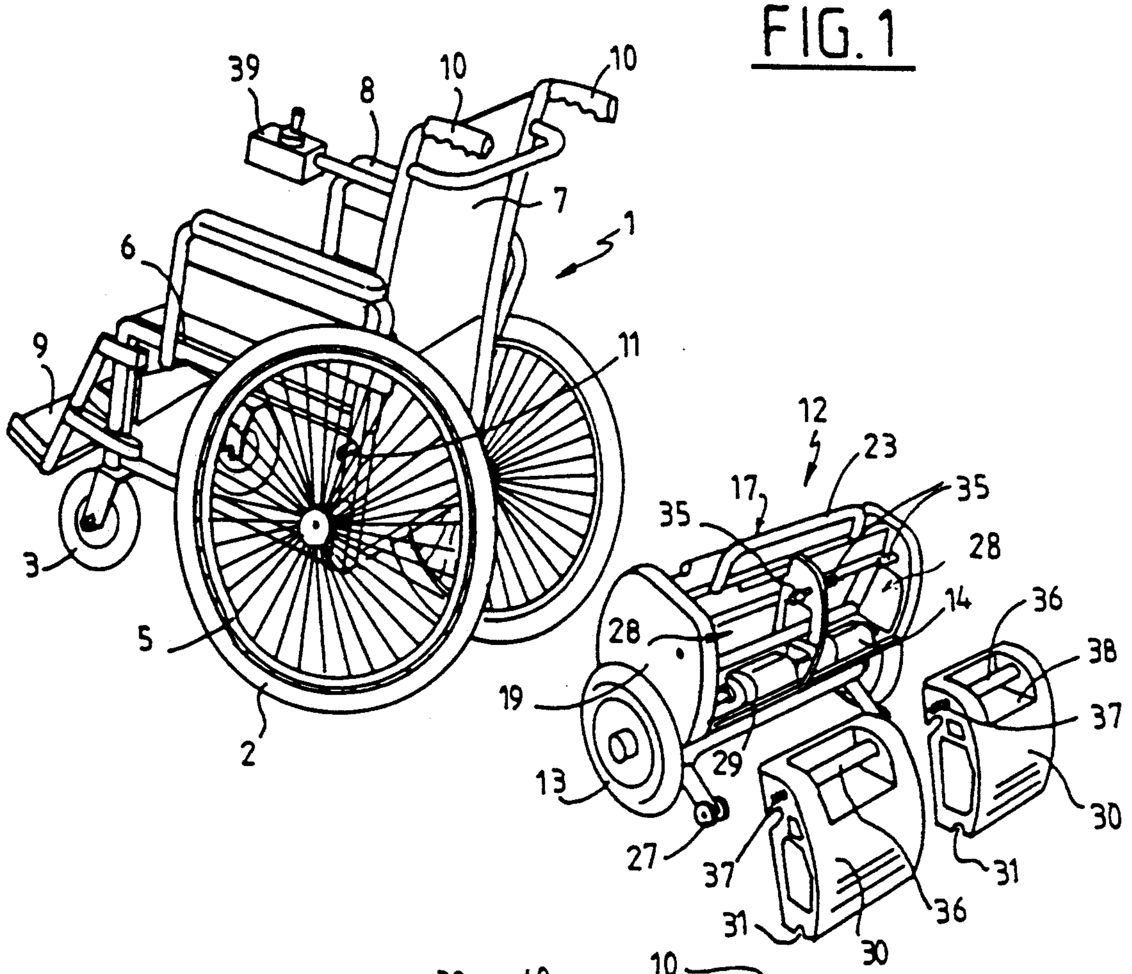
FIG. 1 is a schematic perspective view of a wheelchair and of a propulsion unit according to the invention, the wheelchair being represented in its version for manual use, while the battery boxes of the propulsion unit are shown removed.

The wheelchair shown in FIG. 1 includes a chassis 1 resting at the rear on two large wheels 2, and at the front on two small wheels 3.

The wheels 2 are mounted on horizontal bearings 4 (visible in FIGS. 3 and 4) and comprise handrails 5 which the user normally has to grip in order to move with the wheelchair. As to wheels 3, these are mounted pivotally in vertical sleeves so that the user can easily steer the wheelchair.

The chassis 1 supports, in a manner known per se, a seat 6, a back 7, armrests 8 and footrests 9. Two rearwardly orientated handles 10 are provided on the upper portion of the back 7 so that a person accompanying the user can move the wheelchair. Two coaxial rods 11 extending parallel to the bearings 4 are further provided above the latter for reasons to be specified below.

Although not provided for in the embodiment example contemplated here, chassis 1 could be articulated in its median longitudinal plane without thereby departing from the scope of the present invention.

Figure 2:
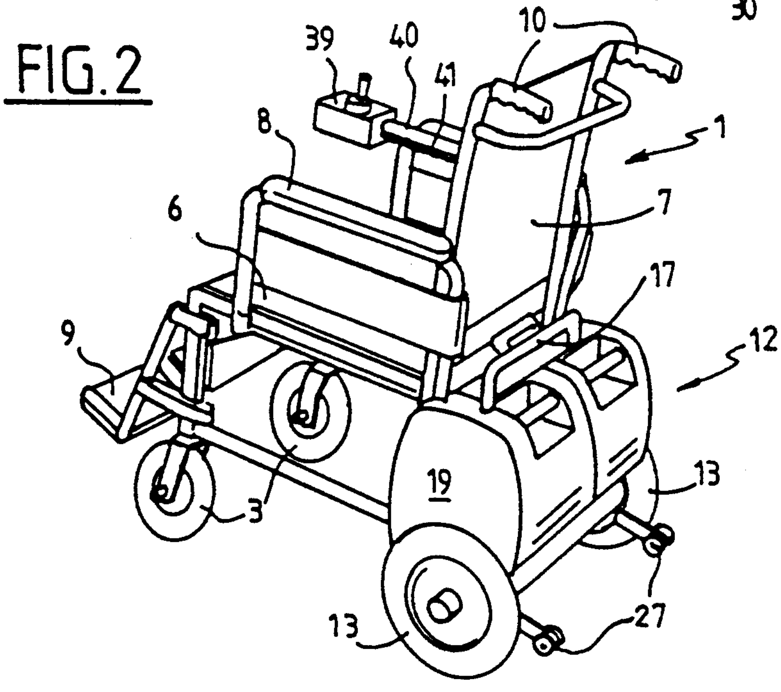
FIG. 2 is a schematic perspective view of the wheelchair in its version for motorized use.

The wheelchair that has just been described is designed to be used in a manual version, as represented in FIG. 1, or in a motorized version, as represented in FIG. 2. It will be noted with reference to this figure that, in the motorized version, wheels 2 are removed and replaced by a propulsion unit 12.

Propulsion unit 12 is self-contained and can be adapted to chassis 1 of the wheelchair without there being any need to use tools. It includes two driving wheels 13, which are smaller than wheels 2, two electric motors 14 to rotate its wheels 13, support means 15 designed to support bearings 4 after wheels 2 have been removed, locking means 16 designed to cooperate with rods 11 of chassis 1 when bearings 4 rest on support means 15, and control means 17 for moving locking means 16 between an active position represented by dotted lines in FIGS. 3 and 4, and an inactive position represented by dot and dash lines in FIG. 3.

Support means 15 include two parallel flanges 18 fixed to the chassis 19 of the propulsion unit in such a way as to project on the forward transverse face of the latter. Flanges 18 each comprise, in their forward face, a slot 20 having an upwardly facing entry and a circular bottom the radius of which is slightly greater than that of bearings 4, slots 20 being designed to receive the latter when propulsion unit 12 and chassis 1 of the wheelchair are rendered integral with one another.

The locking means 16, for their part, include two hooks 21 pivotally mounted about an axis parallel to the axis of wheels 13 of the propulsion unit, as well as elastic members 22 biasing hooks 21 into their active positions.

Figure 5:
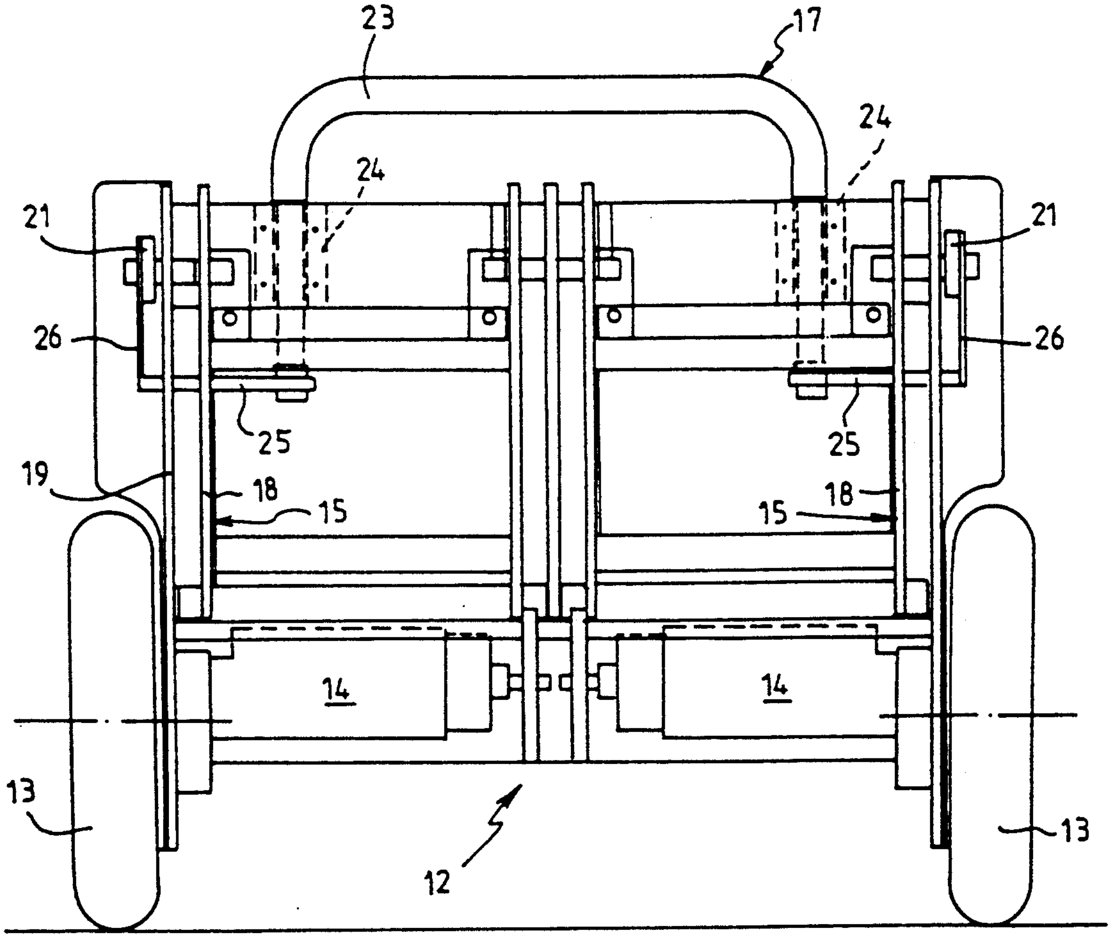
FIG. 5 is a schematic rear view of the propulsion unit, showing the propulsion unit locking means and their control means.
Figure 6:
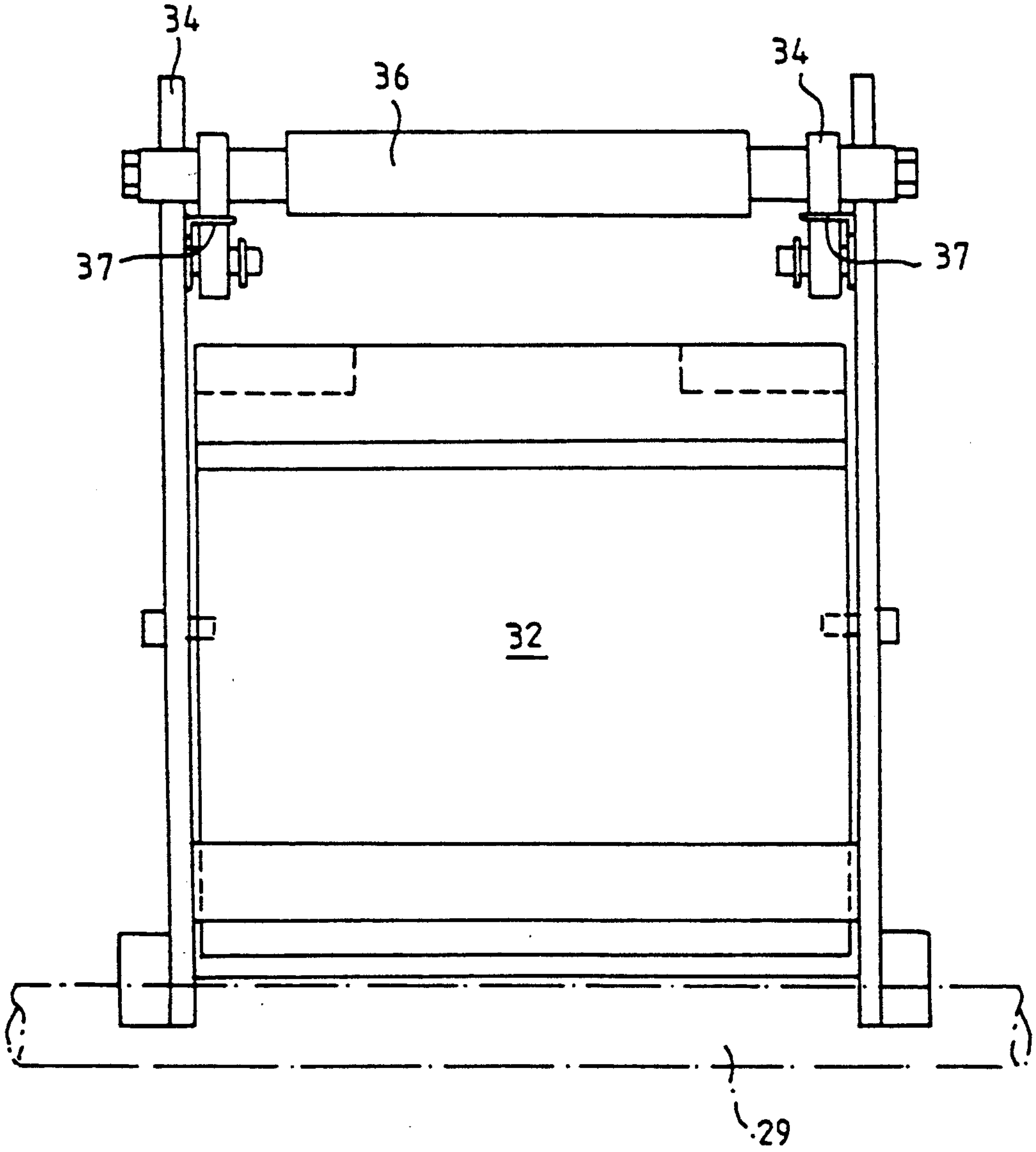
FIG. 6 is a schematic rear view of a battery box showing the locking members and their control means.

As to the control means 17, these include a handle 23 having the shape of an inverted U the base of which projects on the upper face of the propulsion unit, parallel to the axis of wheels 13 of the latter and the arms of which can be moved heightwise in guide sleeves 24 parallel to the forward transverse face of the said propulsion unit. They further include two coaxial links 25 fixed to the free ends of the arms of handle 23 in such a way as to extend outwardly thereof, parallel to its base (see, in particular, FIG. 5), and two connecting rods 26 connecting the links 25 to hooks 21.

Propulsion unit 12 also includes two caster wheels 27 projecting on the lower portion of its rear transverse face and coming into contact with the ground when it is not integral with chassis 1.

Figure 3:
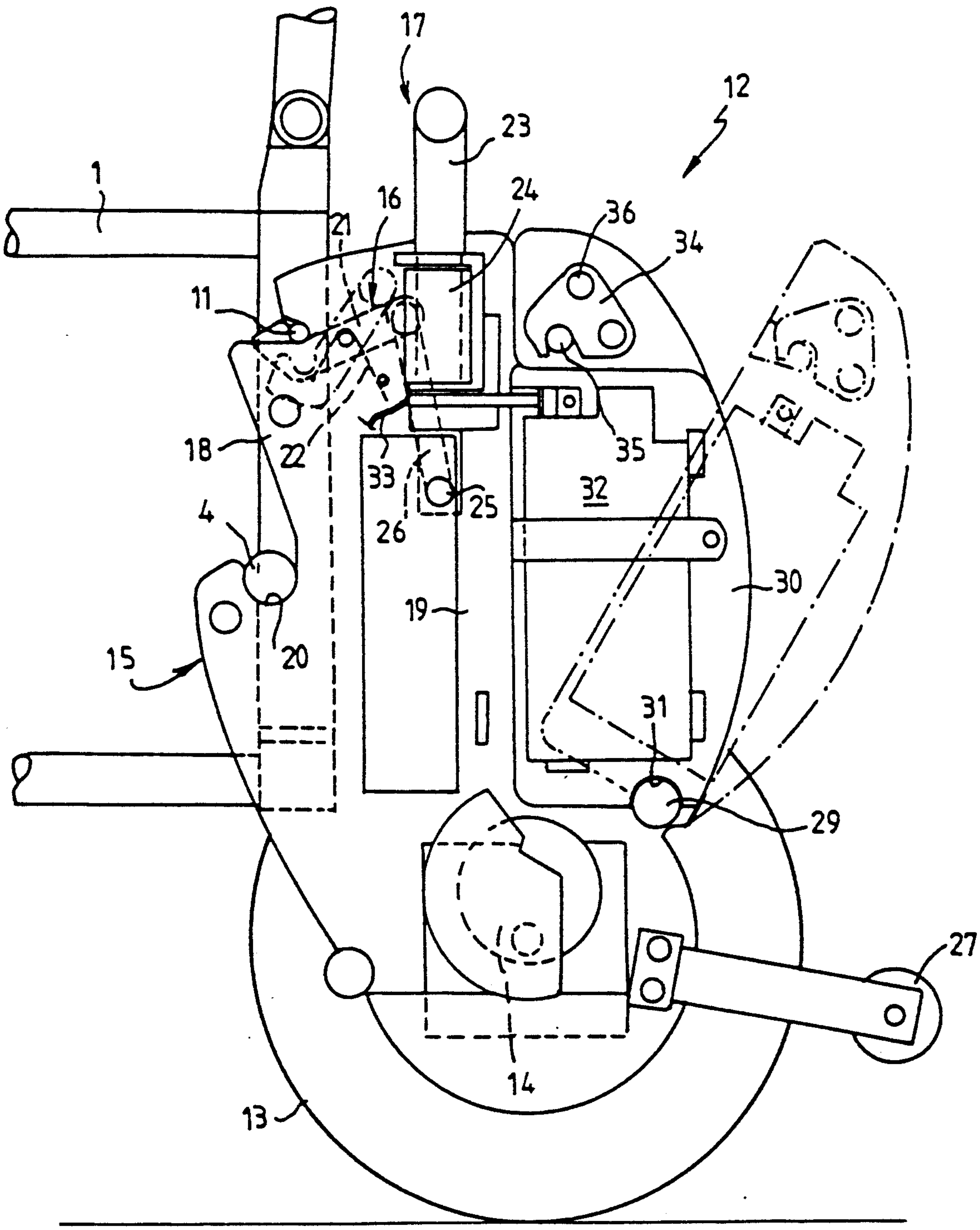
FIG. 3 is a partial schematic side view of the wheelchair shown in FIG. 2.

It is particularly simple and easy to fit propulsion unit 12 to chassis 1 of the wheelchair. The way to proceed is, in fact, to remove, first of all, wheels 2 from chassis 1 in order to disengage bearings 4, then, with the help of handles 10 of chassis 1, to position the latter correctly in front of the propulsion unit so as to be able to introduce bearings 4 into slots 20 in flanges 18, which can be done easily by lowering chassis 1 in the direction of arrow $F_1$ represented in FIG. 4, and then to exert a downward pressure on handles 10 to cause the propulsion unit to pivot in the direction of arrow $F_2$ and to allow hooks 21 to engage with rods 11 of the chassis, as represented in FIG. 3.

Slightly before the propulsion unit arrives in the position represented in this figure, rods 11 move hooks 21 to their inactive positions by causing them to pivot against the action of elastic members 22. It is only, in fact, when the propulsion unit reaches its position as represented in FIG. 3 that the depressed portions provided on hooks 21 arrive opposite rods 11 and that the latter allow the hooks to engage with them.

It should be noted here that caster wheels 27 of the propulsion unit are designed to come into contact with the ground when chassis 1 is inclined backwards, for example when passing over an obstacle, and consequently to oppose the accidental overturning of the wheelchair when tipping backwards.

It is also very simple to separate propulsion unit 12 from chassis 1. Traction should first be applied to handle 23 to disengage hooks 21 from rods 11, and the propulsion unit should be allowed to pivot under its own weight in the direction opposite to that of arrow $F_2$ until its caster wheels 27 come to bear on the ground. It then suffices to push upwards on handles 10 of chassis 1 to extract bearings 4 from slots 20, and to put wheels 2 of the wheelchair back in place.

For information, it should be pointed out here that handle 23 can also be used to transport the propulsion unit.

In the form of embodiment represented, the propulsion unit 12 comprises two housings 28 opening onto its rear transverse face and onto its upper face, as represented in FIG. 1. These housings are each provided with a link 29 disposed in the proximity of their rear lower edge, parallel to the axis of wheels 13 of the propulsion unit, and they receive removable battery boxes 30, the lower face of each comprises, in the vicinity of its rear edge, a cylindrically shaped groove 31.

Figure 4:
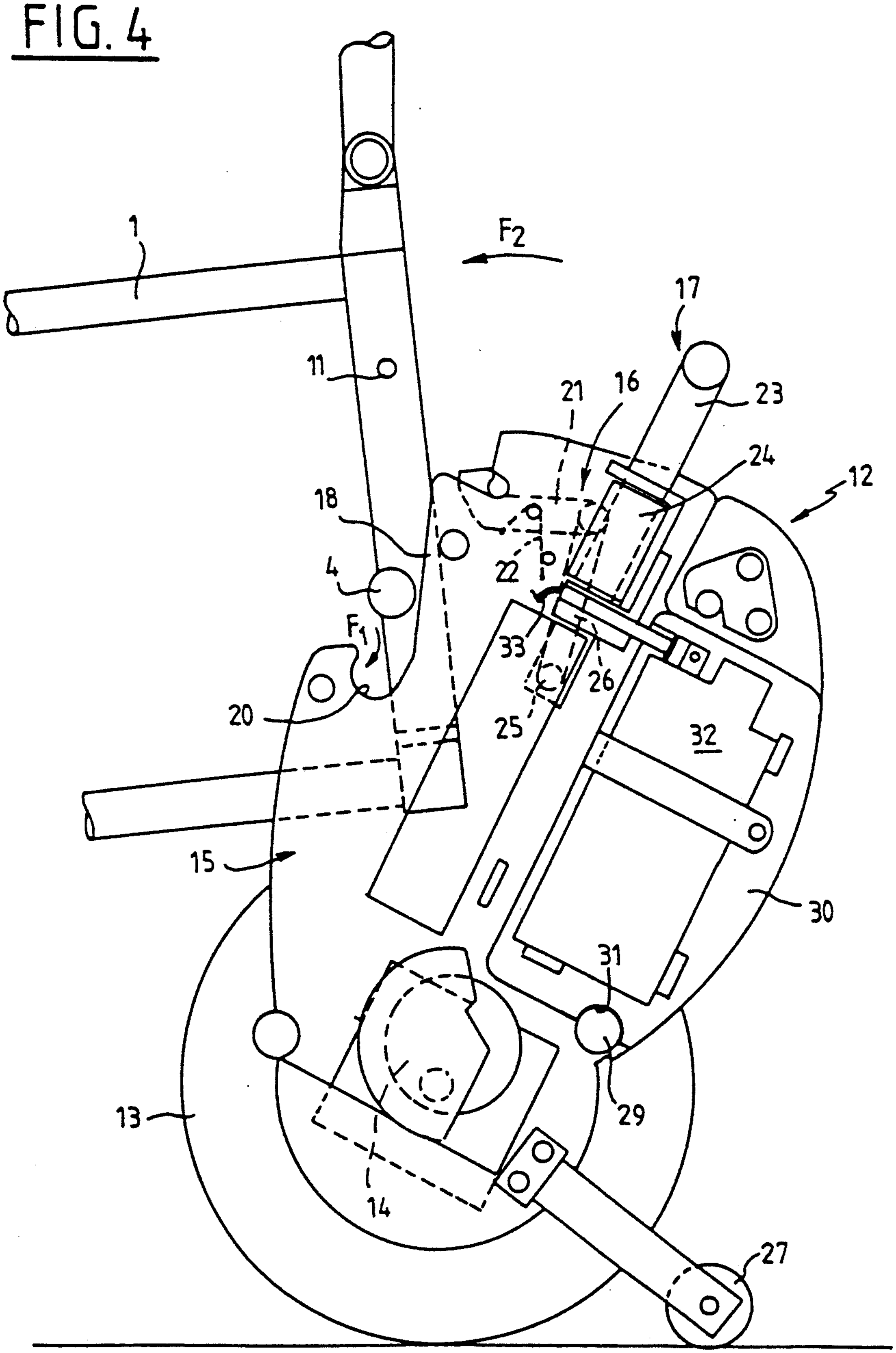
FIG. 4 is a view analogous to that of FIG. 3 but showing the wheelchair and the propulsion unit in the process of being connected to one another.

Boxes 30 are adapted to rest on links 29 via their grooves 31, and to pivot between a connected position, represented by continuous lines in FIGS. 3 and 4, wherein the batteries 32 are connected to an electric circuit 33 in which are mounted electric motors 14, and a disconnected position, represented in dot and dash lines in FIG. 3, wherein batteries 32 are isolated from the electric circuit 33.

Boxes 30 comprise two hooks 34 suitable for cooperating, when they are in their connected position, with retaining members 35 provided in housings 28, and control members 36 enabling hooks 34 to be moved between an active position, represented in continuous lines in FIGS. 3 and 4, and an inactive position, represented in dot and dash lines in FIG. 3.

Retaining members 35 are constituted, in the example illustrated, by four coaxial rods fixed to the transverse faces of housings 28, these rods extending parallel to handle 23, in the vicinity of the forward upper edge of the housings.

As to the hooks 34 provided on the boxes, these are suitable for pivoting about an axis parallel to rods 35 against the action of elastic members such as springs 37 (visible in FIG. 1) biasing them into their active positions.

It will be noted here that hooks 34 are triangular in shape. One of their sides extends substantially horizontally when they are in their active positions. In addition, their axis of articulation is located in the vicinity of their apex the furthest removed from handle 23, while their lower face comprises a depression in the vicinity of their apex nearest to handle 23.

As to the control members 36, these are constituted by two bars each connecting the two hooks 34 of the same box, in the vicinity of their apex which is opposite their lower face.

Bars 36 extend through depressed portions 38 provided on the upper portion of boxes 30 and can thus be accessible from the outside.

To remove boxes 30, for example, to recharge batteries 32, it suffices to apply upward and rearward traction to bars 36. This action in fact enables hooks 34 to pivot from their active position to their inactive position and to release rods 35, and then enables boxes 30 to pivot rearwards on rods 29.

To re-install the boxes, for example after batteries 32 have been recharged, it suffices, of course, to cause them to rest on links 29 at their grooves 31 and to cause them to pivot forwards until hooks 34 come into engagement with rods 35.

The wheelchair represented in the drawings further comprises a manipulator 39 borne by a rod 40 removably mounted along the straight armrest 8. This manipulator, which is of conventional design, is mounted at one of the ends of an electric cable 41 enabling it to be connected removably to electric circuit 33 of the propulsion unit.

By suitably actuating the manipulator, the user can control the two electric motors 14 in such a way that they drive wheels 13 of the propulsion unit, either at the same speed to displace the wheelchair in a straight line, or at different speeds to enable the wheelchair to turn corners.

It goes without saying that electric cable 41 will have to be connected to propulsion unit 12 after the latter has been rendered integral with chassis 1 of the wheelchair. Conversely, it will have to be disconnected before the propulsion unit is detached from the chassis of the wheelchair.

It can be seen from the above that the present invention provides a simple, practical solution for converting a motorless wheelchair at will into a motorized wheelchair.

Of course, there would be no departure from the scope of the present invention if the driving wheels 13 of propulsion unit 12 were driven by motors using an energy other than electricity, or if the wheelchair were replaced by a tricycle.

I claim:

1. Individual vehicle usable in a manual version and a motorized version, more specifically one of a wheelchair and a tricycle, said vehicle including a chassis (1) having a front and rear, said chassis provided, at the rear, with two laterally outwardly extending bearings (4) for receiving one of a pair of removable wheels (2), and a self-contained, removable propulsion unit (12), said propulsion unit including:
   - a locking means (16) for locking the unit to the chassis (1),
   - driving wheels (13) rotatably about an axis, and
   - means (14) for rotationally driving said driving wheels (13), said propulsion unit (12) further comprises support means (15) for directly supporting the bearings (4), and a control means (17) for moving the locking means (16) between an active position wherein the propulsion unit is locked to the chassis and an inactive position wherein the propulsion unit is unlocked from the chassis, said locking means (16) cooperating with retaining means (11) provided on the chassis when the bearings (4) rest directly on said support means (15).

2. Individual vehicle according to claim 1, wherein the support means (15) includes two parallel flanges (18) projecting on a forward transverse face of the propulsion unit (12) and advancing on either side of the bearings (4) when said unit is locked to the chassis (1), said flanges having a transverse forward face comprising a slot (20) provided with an upwardly facing entry and a circular bottom having a radius slightly greater than a radius of the bearings (4).

3. Individual vehicle according to claim 2, wherein the retaining means (11) includes a rod extending parallel to and spaced apart from said bearings (4), and the locking means (16) includes a hook (21) mounted pivotally about an axis parallel to the axis of the driving wheels (13) of the propulsion unit (12), and an elastic member (22) for biasing said hook into engagement with the rod.

4. Individual vehicle according to claim 3, wherein the retaining means (11) include two coaxial rods extending parallel to and spaced apart from the bearings, and the locking means (16) includes two hooks (21) pivotally mounted about an axis parallel to the axis of the driving wheels of the propulsion unit and an elastic member (22) for urging said hook into engagement with the two coaxial rods.

5. Individual vehicle according to claim 4, wherein the control means (17) includes:

- a handle (23) having the shape of an inverted U, said inverted U including a base and two arms, each arm having a free end, the base extends parallel to the axis of the wheels (13) of the propulsion unit (12) and the arms are movably mounted in guide sleeves (24) parallel to the forward transverse face of the said propulsion unit,
- two coaxial links (25) fixed to the free ends of the arms of the handle (23) and extend outwardly thereof, parallel to the base of said handle; and
- two connecting rods (26) connecting the links (25) to the hooks (21).

6. Individual vehicle according to claim 1, wherein the propulsion unit (12) includes caster wheels (27) projecting from a lower portion of a rear transverse face of said propulsion unit so as to come into contact with the ground when said propulsion unit is not locked to the chassis (1).

7. Individual vehicle according to claim 5, wherein the propulsion unit (12) comprises at least one housing (28) opening onto a rear transverse face and an upper face, a link (29) extending parallel to the axis of its wheels (13) in a lower portion of the housing, at least one battery box (30) pivotally mounted in the housing so as to pivot between a connected position in which the batteries (32) are connected to an electric circuit (33) including the means (14) for driving the driving wheels (13) and a disconnected position in which the batteries (32) are isolated from the electric circuit (33).

8. Individual vehicle according to claim 7, wherein said at least one battery box comprises two battery boxes and each battery box (30) comprises locking members (34) for cooperating with a retaining member (35) provided in a corresponding housing (28) when said battery box is in a connected position, and control members (36) for moving the locking members (34) between an active locked position and an inactive unlocked position.

9. Individual vehicle according to claim 8, wherein the retaining members (35) include two coaxial rods extending parallel to the handle (23) and located in a forward upper edge portion of each housing (28), while the corresponding locking members (34) include two hooks pivotally mounted about an axis parallel with the rods (35), and elastic members (37) for biasing the pivotally mounted hooks (34) towards said active positions.

10. Individual vehicle according to claim 9, wherein the control members (36) of each battery box (30) include a gripping bar extending parallel to the axis of the wheels (13) of the propulsion unit (12), said gripping bar projecting on an upper portion of the battery box (30) and connecting the hooks (34) at a location spaced apart from said pivot axes of said hooks.

11. Individual vehicle according to claim 1 further including a manipulator (39) and a removable transmission cable (41) for connecting said manipulator to the propulsion unit (12), the manipulator comprising a means (14) for controlling driving of the driving wheels (13) of the propulsion unit (12) when actuated.

* * * * *